United States Patent
Quader et al.

(10) Patent No.: US 7,188,587 B1
(45) Date of Patent: Mar. 13, 2007

(54) METHODS FOR OPERATING A COMPRESSION IGNITION ENGINE

(75) Inventors: Ather A. Quader, Rochester Hills, MI (US); John E. Kirwan, Troy, MI (US); Philip J. Dingle, Rochester, MI (US); Malcolm James Grieve, Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/290,909

(22) Filed: Nov. 30, 2005

(51) Int. Cl.
*F02B 41/00* (2006.01)

(52) U.S. Cl. .......................................... 123/26; 123/432

(58) Field of Classification Search .................. 123/26, 123/27 GE, 432
See application file for complete search history.

(56) References Cited

U.S. PATENT DOCUMENTS

| | | | |
|---|---|---|---|
| 4,446,821 A * | 5/1984 | Cataldo | 123/26 |
| 6,427,660 B1 | 8/2002 | Yang | 123/304 |
| 6,655,130 B1 | 12/2003 | Kirwan et al. | 60/284 |
| 6,745,744 B2 | 6/2004 | Suckewer et al. | 123/297 |
| 6,761,325 B2 | 7/2004 | Baker et al. | 239/533.3 |
| 2004/0194755 A1 | 10/2004 | Shiraishi et al. | 123/295 |

OTHER PUBLICATIONS

SAE Paper 2000-01-1805 "Effects of Injection Changes on Efficiency and Emissions of a Diesel Engine Fueled by Direct Injection of Natural Gas" Silviu Dumitrescu et al.

SAE Paper 2002-01-1630 "Direct Injection of Natural Gas in a Heavy-Duty Diesel Engine" James Harrington et al.

SAE Paper 2002-01-1158 "Modeling the Effects of Late Cycle Oxygen Enrichment on Diesel Engine Combustion and Emissions" D.K. Mather et al.

SAE Paper 920467 "Reduction of Smoke and NOx by Strong Turbulence Generated During the Combustion Process in D.I. Diesel Engines" Mitsuru Konno et al.

SAE Paper 2004-01-1844 "Exhaust Gas Fuel Reforming for Diesel Engines—A Way to Reduce Smoke and NOx Emissions Simultaneously", Tsolakis et al., 13 pages.

Mechanical Engineering Power, "Cleaner Diesels—Tests at Argonne National Laboratory, escaping a classic tradeoff in emissions, simultaneously reduce particulates and NOx", John DeGaspari, http://www.memagazine.org/supparch/mepower99/cleaner/cleaner.html, 6 pages, May 31, 2005.

Westport Innovations Inc.—Our Expertise, "The Westport-Cycle", http://www.westport.com/expertise/westport_cycle.php, 2 pages, Dec. 2, 2004.

"Late-Cycle Injection of Air/Oxygen-Enriched Air to Reduce Diesel Exhaust Emissions", http://www/transportation.anl.gov/pdfs/EE/286.pdf, 1 page, May 31, 2005.

(Continued)

*Primary Examiner*—Noah P. Kamen
(74) *Attorney, Agent, or Firm*—Paul L. Marshall

(57) ABSTRACT

A method of operating a compression ignition engine is disclosed. The method comprises, introducing an enriching component into a combustion chamber during an intake stroke, igniting the enriching component during the compression stroke, introducing a main injection of fuel to the combustion chamber after the ignition of the enriching component, igniting the main injection of fuel, and introducing a supplemental gas to the combustion chamber after igniting the main injection of fuel.

18 Claims, 1 Drawing Sheet

OTHER PUBLICATIONS

Argonne Transportation—Oxygen Enrichment to Reduce Diesel Soot, "Reducing Diesel Soot by Using Late-Cycle Oxygen Enrichment", Raj Sekar, http://www.transportation.anl.gov/research/engine/soot.html, 2 pages, May 31, 2005.

U.S. Appl. No. 11/040,233, filed Jan. 21, 2005, Applicant: Jean Botti, "Methods of Operating a Compression Ignition Engine and a Vehicle System", 14 pages.

* cited by examiner

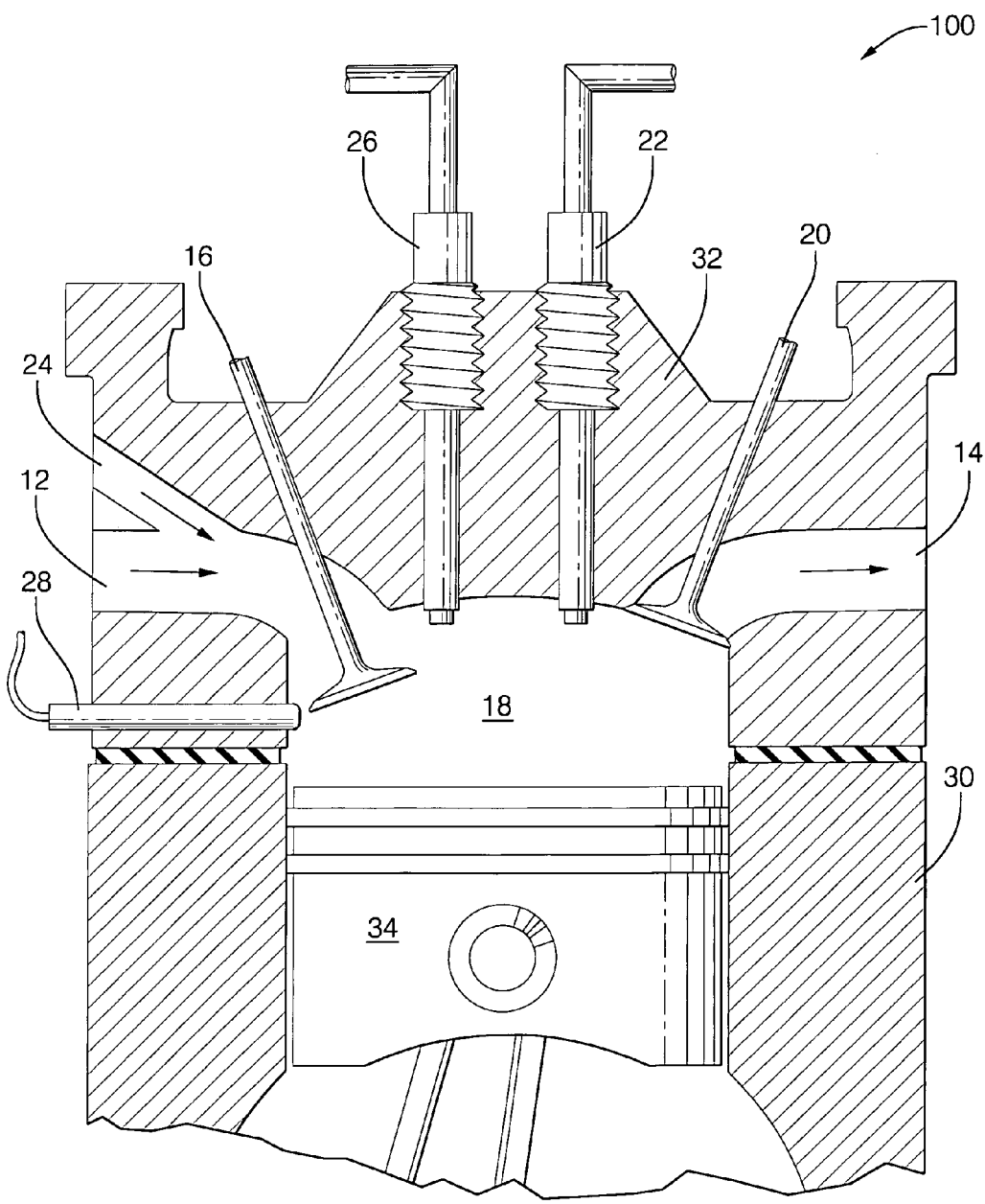
THE FIGURE

METHODS FOR OPERATING A COMPRESSION IGNITION ENGINE

BACKGROUND

Federal and state governments have enacted increasingly stringent laws and regulations on motor vehicle exhaust emissions and fuel economy. In one example, the state of California's regulations include Super Ultra Low Emission Vehicle (SULEV) emission standards, which are particularly stringent on hydrocarbon (HC) and nitrogen oxides ($NO_x$) emissions. As this trend continues, Zero Emission Vehicle (ZEV) standards can eventually become enacted.

In order to meet these increasingly stringent emission requirements, motor vehicle manufacturers can employ exhaust treatment systems that are capable of reducing both gaseous and particulate emissions (e.g., NOx gases, carbon monoxide). These exhaust treatment systems can comprise devices such as catalytic converters, selective catalytic reduction catalysts, and the like, that are capable of reducing the undesirable gaseous constituents (e.g., hydrocarbons, carbon monoxide, NOx) by converting the gases into less-undesirable emissions (e.g., carbon dioxide, water, nitrogen). In concert with devices, particulate filters can be employed to remove hydrocarbon particulate (e.g., soot) from an exhaust stream by trapping the particulate on and/or within a porous substrate and periodically oxidizing the hydrocarbon particulate at elevated temperatures.

Although exhaust systems employing gaseous and particulate remediation devices have proven successful, their cost is inhibitive due to costly catalysts (e.g., platinum, palladium, rhodium) employed therein. This is of concern to consumers and motor vehicle manufacturers as system costs can increase sharply with each proposed emission standard. Therefore, there is a need for innovations in internal combustion engine systems (e.g., spark ignition, compression ignition) that are capable of decreasing the mass of undesirable emissions produced and decreasing the cost and dependence on catalyst-based exhaust after-treatment systems.

SUMMARY

Disclosed herein are methods of operating a compression ignition engine and a vehicle system.

In a first embodiment, a method of operating a compression ignition engine is disclosed. The method comprises, introducing an enriching component into a combustion chamber during an intake stroke, igniting the enriching component during the compression stroke, introducing a main injection of fuel to the combustion chamber after the ignition of the enriching component, igniting the main injection of fuel, and introducing a supplemental gas to the combustion chamber after igniting the main injection of fuel.

The above-described and other features will be appreciated and understood by those skilled in the art from the following detailed description, drawing, and appended claims.

BRIEF DESCRIPTION OF THE DRAWING

The FIGURE is a cross-sectional view of an exemplary embodiment of a compression ignition engine.

DETAILED DESCRIPTION

As will be explained in greater detail below, it has been discovered that both $NO_x$ and particulate matter can be reduced in compression ignition engines by employing a method for controlling the combustion reaction. For example, an intake air source can be mixed with an enriching component and ignited during a compression stroke. Thereafter, a fuel can be introduced to the combustion chamber and ignited to produce power, wherein the fuel burns under locally oxygen-depleted conditions due to the burned enriched intake air, thereby producing less NOx emissions. Thereafter, a supplemental gas can be introduced into the combustion chamber to oxidize soot precursors formed during the oxygen-depleted combustion of the fuel, which decreases particulate matter. The compression ignition engine can be employed alone or in combination with other power generating devices (e.g., an electric motor (e.g., a hybrid vehicle system), a fuel cell (e.g., a proton exchange membrane (PEM) fuel cell and a solid oxide fuel cell (SOFC)), and the like.

The term "enriching component" is used throughout this disclosure, and within the claims, to generically describe gases and/or mixtures of gases comprising hydrogen ($H_2$), carbon monoxide (CO), and nitrogen ($N_2$), as well as combinations comprising at least one of the foregoing.

If ranges are disclosed, these are inclusive and combinable (e.g., ranges of "up to about 25 wt %, with about 5 wt % to about 20 wt % desired", is inclusive of the endpoints and all intermediate values of the ranges of "about 5 wt % to about 25 wt %," etc). The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). Also, the terms "front", "back", "bottom", and/or "top" are used herein, unless otherwise noted, merely for convenience of description, and are not limited to any one position or spatial orientation. The suffix "(s)" as used herein is intended to include both the singular and the plural of the term that it modifies, thereby including one or more of that term (e.g., the metal(s) includes one or more metals).

The term "on-board" is used herein to refer to the production of a given component within a vehicle system. Further, the term "start-up" is used herein to refer to a period of operation of a compression ignition engine wherein the internal temperature of the combustion chamber is too low to reliably support ignition of a compressed fuel and ignition components (e.g., glow plugs, spark plugs) are energized to initiate combustion.

Referring now to FIG. 1, a cross-sectional view of an exemplary compression ignition engine, generally designated 100, is illustrated. The compression ignition engine 100 comprises an intake port 12, an exhaust port 14; an intake valve 16; a combustion chamber 18; a piston 34; a block 30; a head 32; an exhaust valve 20; a fuel injector 22 having a supplemental gas injector 26; an enriching component port 24; and an ignition device 28. The intake port 12 can be disposed in fluid communication with an oxygen source (e.g., air, exhaust gas recycle (EGR) diluents, compressed oxygen, and the like (not shown)) and the exhaust port 14 is disposed in fluid communication with an exhaust conduit (not shown). The intake valve 16 can comprise an open and closed position (open position shown). When in an open position, the intake valve 16 can allow the flow of oxygen, which is supplied through the intake port 12, and an enriching component, which is supplied through the enriching component port 24, into combustion chamber 18 via intake port 12 as illustrated by the directional arrow. When intake valve 16 is in a closed position (similar to the position illustrated for exhaust valve 20), the valve is capable of preventing flow through the intake port 12. Similarly, the exhaust valve 20, which is shown in a closed position, is capable of preventing flow therethrough when in a closed position, and allowing the flow of exhaust to exit combustion chamber 18 via exhaust port 14 (as illustrated by the directional arrow) when positioned in an open position. Piston 34 is capable of reciprocating within the block 30.

Fuel can be injected into combustion chamber 18 via fuel injector 22. Any type or configuration of fuel injector (e.g., mechanical, electronic) can be employed, however electronically controlled fuel injectors can provide improved response when compared to mechanical fuel injectors. In various embodiments, one or more fuel injector(s) can be employed. For example, an exemplary compression ignition engine 100 can be configured to comprise one fuel injector that is capable of two fuel injection events per stroke, wherein the first fuel injection event is a pilot fuel injection and the second event is a main fuel injection. To be more specific, the pilot fuel injection can supply a reduced volume of fuel (as compared to the main injection) to the combustion chamber 18 during a compression stroke to initiate combustion of the enriched inlet air (to be discussed further below). A second fuel injection event can supply a bolus of fuel to the combustion chamber 18 that can be ignited in the presence of the combusted enriched air to provide a power (e.g., expansion) stroke.

Although in this example only two fuel injection events per cycle are described, embodiments of the compression ignition engine 100 can be configured to employ two or more fuel injection events per stroke. As will be described in greater detail below, introducing and igniting an enriching component in a multiple stage combustion process can enable the compression ignition engine 100 to produce a reduced concentration of gaseous and particulate emissions compared to engines that do not employ such a process.

The compression ignition engine 100 can burn hydrocarbon fuels, such as, but not limited to, gasoline, diesel, ethanol, methanol, kerosene, and the like; gaseous fuels, such as natural gas (e.g., methane), propane, butane, and the like; and alternative fuels, such as bio-fuels, dimethyl ether, and the like; as well as combinations comprising at least one of the foregoing fuels. The selection of the fuel can be based upon application, expense, availability, and environmental issues. Examples of diesel fuels include commercial diesel fuels, military diesel fuels (e.g., JP8), blended diesel fuels containing a larger than normal "light end" component (e.g., diesel blended with naphtha, gasoline, kerosene, and/or methanol), and the like, as well as combinations comprising at least one of the foregoing diesel fuels.

The supplemental gas injector 26 can be connected in fluid communication with a supplemental gas source (e.g., air, oxygen-enriched air, reformate, exhaust gas recycle (EGR) diluents, compressed oxygen, and the like (not shown)) and disposed in operable communication with the combustion chamber 18. The supplemental gas injector 26 can be structured capable to supply supplemental gas (e.g., $O_2$) or oxygen-containing gases to the combustion chamber 18 as required to reduce undesirable emissions. In another embodiment (not shown) the fuel injector 22 and supplemental gas injector 26 can be combined into a single apparatus (e.g., dual-fluid injector) capable of controlling the flow of both the fuel and a supplemental gas independently. It is yet further envisioned that in other embodiments additional injector(s) can be employed to enable the supply of additional gases, fluids, or the like, to the combustion chamber 18.

The enriching component port 24 is disposed in fluid communication with an enriching component source (not shown). For example, enriching component port 24 can be disposed in fluid communication with a fuel reformer, which can supply reformate to the intake port 12 through the enriching component port 24. An enriching component can then be injected from the intake port 12 into the combustion chamber with the opening of intake valve 16. The enriching component can be stored within an on-board system, or produced on demand. In one embodiment of an on demand system, a fuel reformer (also referred to as a "reformer") can be employed to reform the on-board fuel (e.g., diesel fuel) into reformats, which can comprise nitrogen ($N_2$), carbon monoxide (CO), and hydrogen ($H_2$), as well as combinations comprising at least one of the foregoing. In yet another embodiment of an on-board reforming system, a fuel can be mixed with an oxygen source (e.g., air, exhaust gas recycle (EGR), and the like) and converted into a reformate comprising nitrogen ($N_2$), carbon monoxide (CO), and hydrogen ($H_2$), as well as combinations comprising at least one of the foregoing, which can also comprise byproducts such as, but not limited to, methane ($CH_4$), nitrogen ($N_2$), carbon dioxide ($CO_2$), water ($H_2O$), and the like. A fuel reformer can comprise a partial oxidation, steam or dry reforming configuration, as well as plasma and catalytic configurations. Alternatively, or in addition, a solid oxide fuel cell system can be employed to provide the enriching component. The enriching component can be provided using a portion of the reformate (from the SOFC system reformer), and/or a portion of the anode tail gas, which can comprise unused hydrogen or unused reformate.

The ignition device 28 can be disposed in communication with combustion chamber 18. More specifically, the ignition device 28 can be positioned relative to the combustion chamber 18 wherein the ignition device can ignite a combustible mixture disposed therein (e.g., a fuel mixture comprising fuel and an enriching component). Suitable ignition devices include glow plugs, spark plugs, and the like.

During normal operation (i.e., engine is operating between normal operating temperatures), the exemplary compression ignition engine 100 (e.g., engine) can produce a reduced volume of gaseous (e.g., NOx, CO) and particulate (e.g., soot) emissions by employing a multiple stage combustion process. The first stage of the multiple stage combustion process comprises supplying the combustion chamber 18 with enriched air. The enriched air comprises a mixture of an enriching component (e.g., reformate), which can be supplied by the enriching component port 24, and oxygen, which can be supplied by the intake port 12. This step can occur during an intake stroke of the piston 34 wherein the intake valve 16 is disposed in an open position, the exhaust valve 20 is disposed in a closed position, and the piston 34 is moving in a direction away from the head 32. The enriching component and oxygen can be combined in the intake port 12 to form the enriched air, which is drawn into the combustion chamber 12 by the increasing volume of the combustion chamber. The enriched air can comprise any ratio of enriching component. To be more specific, a decrease in gaseous and/or particulate emissions can be achieved with the addition of as low as about 1 to about 5 volumetric percent (vol. %) of the enriching component added to the oxidant (e.g., air), based upon a total volume of the enriching component and the air. However, systems can also be configured wherein about 100 vol. % of the enriching component can be supplied if an oxidant is inherently present within the combustion chamber 18 (e.g., from a previous stroke, previous reaction). For example, the enriching component can be combined with the oxidant at a volumetric percentage of about 5 to about 100 vol. %, or more specifically at about 10 vol. % to about 75 vol. %, or even more specifically at about 20 vol. % to about 50 vol. %.

Once a volume of enriched air has been drawn into the combustion chamber, the intake valve 16 is retracted into a closed position, and the piston 34 begins a compression stroke (e.g., advancing towards head 32), the compression stage of the combustion process can begin. During this stage, the enriched air is compressed as an amount of fuel (e.g., pilot injection, which can be about 1% to about 5% of the total fuel energy supplied to the engine during a single cycle) is injected into the combustion chamber 18 via the fuel injector 22, thereby forming an enriched air/fuel mixture. To be more specific, the pilot injection can be introduced into the combustion chamber 18 as early as about bottom dead center and as late as top dead center (e.g., up to about 20° of top dead center). However, in some embodiments, if the pilot injection is added at about bottom dead center to about 90° before top dead center, the pilot injection can homogeneously mix with the enriched air, which can cause the mixture to be difficult to ignite. Rather, if the pilot injection is introduced at about 90° to about 20° before top dead center, or at about 20° before top dead center to about top dead center, the injection can remain in a localized heterogeneous mixture which can favor ignition.

In addition, the rate at which the pilot injection is introduced to the combustion chamber 18 can be varied, however the pilot injection should be completed prior to main fuel injection. The amount of fuel injected during the pilot ignition can vary based upon variables such as, but not limited to, engine load, enriched air mixture, fuel employed, operating temperature, and the like. In one exemplary embodiment, the amount of fuel injected can be calculated by an on board engine controller (not shown) based on engine load and the enhanced air composition.

The enriched air/pilot fuel mixture can be ignited utilizing compression, an ignition source 28 (e.g., spark, glow plug, and so forth), and so forth, as well as a combination of the foregoing. Ignition source 28 is generally used during start-up, while compression is generally used during normal operating conditions. Once the enriched gas/fuel mixture has been ignited, a bolus of fuel (main injection of fuel), can be supplied to the combustion chamber 18 by fuel injector 22 to produce a power stroke (e.g., expansion stroke, combustion stroke). The start of the main fuel injection to the combustion chamber can be at about 60° before top dead center to about 30° after top dead center, or more specifically about 45° before top dead center to about 10° after top dead center, and even more specifically from about 20° before top dead center to about top dead center. A fuel pressure of greater than or equal to about 1,000 pounds per square inch (psi), or more specifically, greater than or equal to about 4,000 psi, or even more specifically at about 10,000 psi to about 30,000 psi, can be employed in an exemplary engine comprising a compression ratio of 18:1. It is to be understood this fuel pressure can vary based on engine configuration, calibration, and control factors. Once the main injection of fuel has been supplied to the combustion chamber 18, the main fuel can be ignited by the combustion of the enriched air/pilot fuel mixture, an ignition source 28, compression, and so forth, as well as combinations comprising at least one of the foregoing. This is the initiation of the main combustion stage.

During the main combustion stage, the piston 34 is pushed away from head 32 by the combustion reaction within the combustion chamber 18. During the reaction, the remaining oxidant following the enriched air/pilot fuel combustion burns with the main fuel in a locally oxygen-depleted reaction. Under these conditions, a lower mass of NOx gases are produced, compared to systems that do not employ oxygen-depleted combustion. However, these conditions are conducive to the formation of a high quantity of particulate (e.g., soot) precursors (e.g., unburned hydrocarbons). To ensure low particulate production by the engine, a supplemental gas can be supplied to the combustion chamber 18 by the supplemental gas injector 26, to oxidize the particulate precursors. To be more specific, the supplemental gas supplied to the system can comprise any concentration of oxygen. For example, environmental air can be employed (e.g., about 21 vol. % $O_2$), as well as pure oxygen (e.g., about 100 vol. % $O_2$). Further, in some heterogeneous combustion diesel systems (e.g., combustion of a non-homogeneous fuel mixture), an ample amount of oxygen can be present within the combustion chamber 18 around the periphery of the heterogeneous combustion reaction. In these systems a supplemental gas can be introduced to the combustion chamber 18 to encourage mixing, or turbulence, of the oxygen already present within the combustion chamber 18 to initiate the oxidation of the soot precursors. In these systems, the supplemental gas can comprise no oxygen, and can be formed from inert gases (e.g., nitrogen) or gases that are readily available to the engine (e.g., reformate, exhaust).

The supplemental gas can be injected into the combustion chamber at about 5° to about 90° after top dead center, or more specifically at about 10° to about 45° after top dead center, or most specifically, at about 15° to about 30° after top dead center. To inject the supplemental gas into the combustion chamber 18 during the expansion stroke, the supplemental gas (e.g., air) can be injected with a force greater than that produced by the combustion reaction. To be more specific, in an exemplary compression ignition engine 100 comprising an 18:1 compression ratio, the force exerted by the combustion reaction can be greater than or equal to about 2,000 pounds per square inch (psi). In this specific example, the supplemental gas can comprise a pressure of greater than or equal to about 2,000 psi. However, a pressure equal to or greater than about 2,500 psi, or equal to or greater than about 3,500 psi, can be employed. In addition, it is to be understood the supplemental gas can be most effective at reducing soot precursors if oxygen is combined with the combustion reaction during the reaction or when the reaction's temperatures are conducive to oxidizing the precursors (e.g., greater than or equal to about 800° C.).

The final stage of the combustion process is the exhaust stage, wherein the exhaust valve 20 is advanced into an open position and the piston 34 advances toward the head 32. The volumetric change in the combustion chamber 18 pushes the exhaust produced from the combustion chamber 18 through the exhaust port 14 in a direction illustrated by the directional arrow.

The exemplary compression ignition engine 100 disclosed herein can be capable of reducing the total volume of at least one emission component (e.g., a gaseous emission (such as NOx, CO, and so forth), particulate emission (such as soot)), produced by the engine by greater than or equal to about 10% per emission component, or more specifically greater than or equal to about 40%, or even more specifically greater than or equal to about 70%, compared to emissions produced by compression ignition engines that do not employ a multiple stage ignition process.

In the exemplary embodiment disclosed, the enriching component can be a reformate comprising hydrogen, carbon monoxide and nitrogen, as well as combinations comprising at least one of the following. Furthermore, the fuel employed can be diesel fuel. As discussed, the enriching component (e.g., reformate) is supplied to the compression ignition engine via the enriching component port 24 after mixing with an oxidant to form enriched air in the intake port 12. In other embodiments, reformate can be directly injected into the combustion chamber 18 utilizing an injector capable of controlling the flow therethrough.

Moreover, the enriching component and supplemental gas can be injected into the combustion chamber 18 based upon the composition of the exhaust produced by the compression ignition engine 100. For example, a gas sensor can be disposed in fluid communication with the exhaust exiting the engine to monitor NOx, particulate emissions, oxygen concentration, carbon monoxide concentration, hydrogen concentration, and the like, as well as combinations comprising at least one of the foregoing. The gas sensor can be connected in operable communication with a process controller (e.g., computer, process controller) that is capable of controlling the flow of an enriching component, supplemental gas, and/or a fuel into the combustion chamber 18.

The compression ignition engine 100 disclosed herein can decrease undesirable emissions by employing a multiple stage combustion process, wherein an enriching component is employed to enable oxygen-depleted combustion conditions and a supplemental gas is employed to reduce soot precursors formed therefrom. As a result, the engine can reduce or eliminate the need for various exhaust aftertreatment devices, such as $NO_x$ absorbers and/or a particulate filters, and reduce the cost of exhaust aftertreatment systems for both consumers and manufacturers alike. Furthermore, the methods disclosed herein can be employed on existing compression ignition engines, thereby enabling an efficient and cost-effective method of complying with increasingly restrictive emissions requirements.

This process comprises various fuel and enriching component injections in a single cycle, wherein a cycle comprises one intake stroke, one compression stroke, one expansion stroke (also referred to as a combustion stroke), and one exhaust stroke. Due to this process, emission components (e.g., gaseous emissions and/or particulate emissions) in the engine exhaust can be reduced. To be more specific, in one embodiment of the compression ignition engine 100, an enriching component is combined with air to produce an enriched air. The enriched air is drawn, or injected, into the combustion chamber 18 during an intake stroke. During the compression stroke that follows, a pilot injection of fuel is injected into the combustion chamber to produce an enriched air/pilot fuel mixture. The enriched air/pilot fuel mixture is then ignited (e.g., ignition device 28). After initiating combustion of the enriched air/pilot fuel mixture, or after the combustion reaction is complete, a main injection of fuel is injected into the combustion chamber 18 during the compression stroke and/or during expansion stroke that follows. The main injection of fuel is then ignited in the presence of the gases produced by combustion of the enriched air/pilot fuel, which creates a oxygen-depleted combustion reaction that powers the expansion stroke.

The oxygen-depleted reaction produces a reduced volumetric concentration of gaseous emissions (e.g., NOx) in the exhaust formed, however also forms a higher volumetric concentration of particulate (e.g., soot) precursors in the exhaust formed when compared to a near stoichiometric or fuel-lean combustion conditions. To reduce the particulate precursors in the exhaust, during the expansion stroke, a supplemental gas is injected into the combustion chamber to oxidize the particulate precursors. As a result, the total volumetric concentrations of emission components (e.g., gaseous emissions (NOx) and particulate emissions (soot)) are reduced in the exhaust produced by the compression ignition engine 100.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of operating a compression ignition engine, comprising:
   introducing an enriching component into a combustion chamber during an intake stroke;
   igniting the enriching component during the compression stroke;
   introducing a main injection of fuel to the combustion chamber after the ignition of the enriching component;
   igniting the main injection of the fuel; and
   introducing a supplemental gas to the combustion chamber after igniting the main injection of fuel and during an expansion stroke.

2. The method of claim 1, wherein the enriching component comprises hydrogen.

3. The method of claim 1, wherein the enriching component is provided by a device selected from the group consisting of a reformer, a solid oxide fuel cell, and a combination comprising at least one of the foregoing.

4. The method of claim 1, comprising igniting the enriching component is with an element selected from the group consisting of a pilot injection of fuel, a glow plug, a spark plug, and a combination comprising at least one of the foregoing.

5. The method of claim 4, wherein the pilot injection ignites the enriching component, and wherein the main injection of fuel is ignited in the presence of combustion products from the enriching component.

6. The method of claim 1, comprising injecting the pilot injection when the compression stroke is at about bottom dead center to about top dead center.

7. The method of claim 6, comprising injecting the pilot injection when the compression stroke is at about 90° to about 20° before top dead center.

8. The method of claim 6, comprising injecting the pilot injection when the compression stroke is at about 20° to about top dead center.

9. The method of claim 1, comprising start of the main injection at about 60° before top dead center on the compression stroke to start of main injection at about 30° after top dead center on the expansion stroke.

10. The method of claim 9, comprising start of the main injection at about 45° before top dead center on the compression stroke to start of main injection at about 10° after top dead center on the expansion stroke.

11. The method of claim 10, comprising start of the main injection at about 20° before top dead center on the compression stroke to start of main injection at about top dead center on the compression stroke.

12. The method of claim 1, comprising introducing the supplemental gas at about 5° to about 90° after top dead center on the expansion stroke.

13. The method of claim 12, comprising introducing the supplemental gas at about 10° to about 45° after top dead center on the expansion stroke.

14. The method of claim 13, comprising introducing the supplemental gas at about 15° to about 30° after top dead center on the expansion stroke.

15. The method of claim 1, comprising introducing main injection of the fuel and the supplemental gas using a dual-fluid injector.

16. The method of claim 1, wherein the supplemental gas is selected from the group consisting of oxygen, oxygen-enriched air, compressed air, atmospheric air, and combinations comprising at least one of the foregoing.

17. The method of claim 1, wherein the supplemental gas comprises an inert gas.

18. A method of operating a compression ignition engine, comprising:
   introducing an enriching component into a combustion chamber during an intake stroke;
   injecting a pilot injection when the compression stroke is at about bottom dead center to top dead center;
   igniting the enriching component with the pilot injection of fuel during the compression stroke;
   introducing a main injection of fuel to the combustion chamber after the ignition of the enriching component;
   igniting the main injection of fuel in the presence of combustion products from the enriching component; and
   introducing a supplemental gas to the combustion chamber after igniting the main injection of fuel and during an expansion stroke.

* * * * *